United States Patent [19]

Kirsch et al.

[11] Patent Number: 5,248,763
[45] Date of Patent: Sep. 28, 1993

[54] ISOLATION OF POLY(ESTER)CARBONATES FROM METHYLENE CHLORIDE USING CARBON DIOXIDE FLUID

[75] Inventors: Jürgen Kirsch; Günther Weymans, both of Leverkusen; Dieter Freitag, Krefeld, all of Fed. Rep. of Germany

[73] Assignee: Bayer Aktiengesellschaft, Leverkusen, Fed. Rep. of Germany

[21] Appl. No.: 932,471

[22] Filed: Aug. 20, 1992

[30] Foreign Application Priority Data

Aug. 29, 1991 [DE] Fed. Rep. of Germany ....... 4128683

[51] Int. Cl.$^5$ .................... C08G 64/40; C08G 63/90
[52] U.S. Cl. .................. 528/490; 528/196; 528/483; 528/491
[58] Field of Search ............. 528/490, 483, 491, 196

[56] References Cited

U.S. PATENT DOCUMENTS 5,080,845  1/1992  Herrmann et al. .................. 264/101
5,126,428  6/1992  Freitag et al. ..................... 528/196

FOREIGN PATENT DOCUMENTS 0334314  9/1989  European Pat. Off. ............ 528/490
4117751  1/1992  Fed. Rep. of Germany .
4118230  6/1992  Fed. Rep. of Germany .

Primary Examiner—Harold D. Anderson
Attorney, Agent, or Firm—Joseph C. Gil; Aron Preis

[57] ABSTRACT

A process for isolating a poly(ester)carbonate resin from its methylene chloride solution is disclosed. The process entails combining a solution which contains 5 to 30% by weight resin with carbon dioxide fluid in a two-component nozzle under pressures of 90 to 180 bar and at temperatures of 50° to 75° C., while maintaining in said the two-component nozzle a back-pressure of 85 to 150 bar, and introducing the resin into a separation vessel with retention of dust particles. Importantly, the relative quantities of carbon dioxide fluid and polymer solution used in the two-component nozzle are between 10 and 3 parts carbon dioxide fluid per one part of polymer solution, and the carbon dioxide fluid contains 10 to 1000 ppm methylene chloride. The process avoids blockage of said nozzle.

1 Claim, No Drawings

ISOLATION OF POLY(ESTER)CARBONATES FROM METHYLENE CHLORIDE USING CARBON DIOXIDE FLUID

FIELD OF THE INVENTION

The invention relates to the manufacture of poly(ester)carbonate resin and more particularly to the isolation of the resin from its methylene chloride solution.

SUMMARY OF THE INVENTION

The present invention relates to a process for isolating a resin selected from the group consisting of polycarbonate and polyester carbonates from its solution in methylene chloride. Accordingly, a 5 to 30% solution of resin in methylene chloride (said percent being relative to the weight of solvent and polymer), at 20° to 50° C. and under pressures of 0.1 to 10 bar, is subjected to a process which is characterized by the following:

a) the solution is combined with carbon dioxide in a two-component nozzle under pressures of 90 to 180 bar and at temperatures of 50° to 70° C., while
b) maintaining in said two-component nozzle a back-pressure of at least 85 bar and at most 150 bar, and
c) the resin is then expanded in a separation vessel with retention of dust particles, and evaporation of carbon dioxide/methylene chloride mixture,
d) the evaporated carbon dioxide/methylene chloride mixture is returned to the process with condensation of methylene chloride and subsequent compression of the remaining carbon dioxide, and
e) the relative quantities of carbon dioxide fluid and polymer solution used in the two-component nozzle being between 10 and 3 parts carbon dioxide fluid per one part resin solution, and where the carbon dioxide used in step a) already contains between 10 and 1000 ppm methylene chloride.

BACKGROUND OF THE INVENTION

German patent application P 4 118 230.8 (Le A 28 460) describes a process for isolating polymers from their solvents by addition of fluids containing carbon dioxide at temperatures of 30° to 280° C. and under pressures of 1 bar to 1000 bar which is characterized in that the concentration of the polymers in their solvents is between 5% by weight and 80% by weight and the fluid containing carbon dioxide consists of at least 50% by weight carbon dioxide. This process has the advantage over other processes for isolating polymers from their solvents, as described for example in U.S. Pat. No. 4,634,761, in EP 334,314-A2, in DE 3,840,293, in JP 01,168,730-A2 and in the Article by Yamamoto Koji et al. in Kagaku Kogaku Ronbunshu 15(3), 1989, pages 673-675, in that it enables large quantities of product to be quickly and simply removed without significantly exposing the product to heat.

In German patent application P 4 117 751.7 (Le A 28 369), it was additionally found that the isolation process described in P 4118230.8 (Le A 28 460) can be improved in regard to the powder formed by applying a special measure for polycarbonates. That application describes a continuous process for isolating polycarbonates from methylene chloride at temperatures of 30° to 80° C. in powder form with residual solvent contents below 5% by weight, characterized in that a) starting out from a solution of polycarbonate in methylene chloride containing, 10 to 40%. by weight polycarbonate, based on the total weight of the polycarbonate solution,
b) fluid containing carbon dioxide is first incorporated under such conditions that the polycarbonate/methylene chloride/carbon dioxide system doe is not gel, normally under pressures of 10 to 50 bar and at temperatures of 30° to 50° C.,
c) the solution under pressure containing polycarbonate, methylene chloride and carbon-dioxide-containing fluid is then combined in a two-component nozzle with another carbon-dioxide-containing fluid under a pressure of 50 to 300 bar and preferably under a pressure of 70 to 200 bar and at temperatures of 40° to 80° C. and preferably at temperatures of 45° to 60° C.,
d) a residence time of at least 0.1 second being introduced between steps b) and c) and
e) the dosage of fluid containing carbon dioxide is generally controlled so that, in step b) the polycarbonate/methylene chloride/carbon dioxide system is above the gelation range and the polycarbonate rapidly precipitates from the three-phase system in the form of solid particles,
f) methylene chloride and carbon dioxide gases are optionally separated to a large extent in a compressor/condenser system and carbon dioxide is returned to the distraction process.

The isolation of high-viscosity, highly heat-resistant polycarbonates by known methods presents a number of difficulties because, on account of their particular physical properties, these polycarbonates can be difficult to isolate from their organic solvents in evaporation extruders or in known precipitation processes, for example using steam or by spray drying, optionally using another solvent, such as n-heptane for example. The same also applies generally to polycarbonates of very high molecular weight and to polyester carbonates having high glass temperatures, particularly those having glass temperatures above 180° C.

The same problem also affects the special polycarbonates described in DE-OS 3 832 396 (Le A 26 344) which are based on diphenols having special cycloaliphatic lateral groups, more particularly polycarbonates containing more than 40 mol-% of these diphenols.

In addition, it is important in the process to establish isolation conditions which protect the nozzles used against blockage and back-pressure. This applies quite generally to polycarbonates.

DETAILED DESCRIPTION OF THE INVENTION

The present invention relates to a process for isolating polycarbonates or polyester carbonates from solutions in methylene chloride using carbon dioxide fluids which avoids blockage of the nozzles used.

It has been found that poly(ester)carbonates from 5 to 30% by weight methylene chloride/poly(ester)carbonate solutions by weight polymer, based on the total weight of solvent and polymer), present at 20° to 50° C. and under pressures of 0.1 to 10 bar, can be isolated from their solvent by a) combining carbon dioxide containing at least 10 ppm and at most 1000 ppm methylene chloride with poly(ester) carbonate/methylene chloride solution in a two-component nozzle under pressures of 90 to 180 bar and at temperatures of 50° to 70° C.,
b) the two-component nozzle ensuring a back pressure of at least 85 bar and at most 150 bar, c) subsequent expansion in a separation vessel with retention of dust particles, d) evaporating carbon dioxide/methylene chloride mixture being returned to the process with condensation of methylene chloride and subsequent compression of the remaining carbon dioxide, steps being taken to ensure that between 10 and 1000 ppm methylene chloride is always present in the carbon dioxide, and e) the quantities of carbon dioxide fluid and polymer solution used in the two-component nozzle are generally between 10 and 3 parts carbon dioxide fluid per part polymer solution.

The present invention relates to a process for isolating polycarbonates and/or polyester carbonates from 5 to 30% by weight methylene chloride/poly(ester)carbonate solutions (% by weight polymer, based on the total weight of solvent and polymer), present at 20° to 50° C. and under pressures of 0.1 to 10 bar, in which a) carbon dioxide is combined with the poly(ester) carbonate/methylene chloride solution in a two-component nozzle under pressures of 90 to 180 bar and at temperatures of 50° to 70° C., b) the two-component nozzle ensures a back-pressure of at least 85 bar and at most 150 bar, c) the polycarbonate is subsequently expanded in a separation vessel with retention of dust particles, d) evaporating carbon dioxide/methylene chloride mixture being returned to the process with condensation of methylene chloride and subsequent compression of the remaining carbon dioxide, and e) the quantities of carbon dioxide fluid and polymer solution used in the two-component nozzle being between 10 and 3 parts carbon dioxide fluid per part polymer solution, characterized in that the carbon dioxide used in step a) already contains between 10 and 1000 ppm methylene chloride.

The polycarbonate precipitated is expanded together with the methylene chloride and the fluid containing carbon dioxide in an expansion vessel. The arrangement of the nozzle and the expansion vessel is preferably selected so that, before it is deposited in the expansion vessel, the powder is airborne for at least 1/10th of a second. The powder may then be further processed to granules and may optionally be compacted.

In its initial phase, the process is started with fluid excesses of 7 to 15 parts by weight per part by weight polycarbonate/methylene chloride solution, based on parts by weight polycarbonate/methylene chloride solution introduced, and preferably with excesses of 7 to 10 parts by weight and, more particularly, 8 to 10 parts by weight. In the first few minutes of the process, the $CO_2$ fluid used may even be present in relatively impure form (for example the fluid contains only 50 to 60% by weight pure carbon dioxide, based on total fluid mass, while the other components consist, for example, of other inert gases or may be impurities inherent in the process. After 3 to 10 minutes, the quantity of fluid is generally reduced continuously in I to 10 minutes to excesses of 2 to 4 parts by weight fluid per part by weight polymer solution. It can be of advantage in this regard continuously to increase the pressure from 60–150 bar to 80–200 bar and the entry temperature of the fluid from 70°14 100° C. to 90°–130° C.

The fluid is returned to the process via a condenser/compressor system. The fluid must contain at least 10 ppm methylene chloride impurities.

Suitable polycarbonates and polyester carbonates are any known thermoplastic polycarbonates and polyester carbonates with, in principle, any molecular weight distributions, uniformities, glass temperatures, quantitative ratios, molecular architectures (including statistical and block copolymers with the usual quantities of branching agents and known terminal groups).

The process is preferably used for poly(ester)carbonates having molecular weights Mw (weight average, as determined by gel permeation chromatography) of 18,000 g/mol to 200,000 g/mol.

The invention is further illustrated but is not intended to be limited by the following examples in which all parts and percentages are by weight unless otherwise specified.

EXAMPLES

Example 1

700 g polycarbonate based on 1,1-bis-(4-hydroxyphenyl)-3,3,5-trimethyl cyclohexane having a relative viscosity, as measured for 5 g polymer to 1000 g methylene chloride at 25° C., of 1.28 are dissolved in 4300 g methylene chloride. The polymer solution is accommodated in a 50 liter autoclave at 50° C. The solution is then combined with carbon dioxide to which 50 ppm methylene chloride (based on the throughput of carbon dioxide) is added in a hollow-cone mixing nozzle with two inlets, one for carbon dioxide and the other for the polymer solution. The feed rate of the polymer solution and the carbon dioxide in the nozzle is adjusted. The nozzle opens into a 100 liter expansion vessel in which the precipitating polycarbonate is swirled together with the methylene chloride and the carbon dioxide.

Process temperature at the nozzle, back pressure 90 bar, $CO_2$ pressure 95 bar, temperature of the $CO_2$ 75° C., preheating temperature of the polymer solution 50° C.

Result

A free-flowing powder having a residual methylene chloride content of around 0.5% is obtained.

Example 2

The procedure is as in Example 1 using a polycarbonate based on 2,2-bis-(4-hydroxyphenyl)-propane having the same relative viscosity.

Result

A free-flowing powder having a residual solvent content of 0.9% is obtained.

Although the invention has been described in detail in the foregoing for the purpose of illustration, it is to be understood that such detail is solely for that purpose and that variations can be made therein by those skilled in the art without departing from the spirit and scope of the invention except as it may be limited by the claims.

What is claimed is:

1. A process for isolating a resin selected from the group consisting of polycarbonate and polyester carbonate from a methylene chloride solution thereby comprising a) combining said solution which contains 5 to 30% by weight resin with carbon dioxide fluid in a two-component nozzle under pressures of 90 to 180 bar and at temperatures of 50° to 75° C., b) maintaining in said the two-component nozzle a back-pressure of 85 to 150 bar, c) introducing the resin into a separation vessel with retention of dust particles, said process being characterized in that the relative quantities of carbon dioxide fluid and polymer solution combined in the two-component nozzle are between 10 and 3 parts carbon dioxide fluid per one part of polymer solution, and in that said carbon dioxide fluid contains 10 to 1000 ppm methylene chloride.

* * * * *